United States Patent
Horton et al.

(10) Patent No.: US 8,596,364 B2
(45) Date of Patent: Dec. 3, 2013

(54) PROCESS FOR PREVENTING OR REMEDIATING TRITHIAZINE DEPOSITION IN HIGH $H_2S$ WELLS

(75) Inventors: Robert L. Horton, Sugar Land, TX (US); Randy Stoker, Richmond, TX (US); Paul Davis, Spring, TX (US)

(73) Assignee: M-I LLC, Houston, TX (US)

( * ) Notice: Subject to any disclaimer, the term of this patent is extended or adjusted under 35 U.S.C. 154(b) by 302 days.

(21) Appl. No.: 12/594,468

(22) PCT Filed: Apr. 1, 2008

(86) PCT No.: PCT/US2008/059043
§ 371 (c)(1),
(2), (4) Date: Mar. 17, 2010

(87) PCT Pub. No.: WO2008/124404
PCT Pub. Date: Oct. 16, 2008

(65) Prior Publication Data
US 2010/0163255 A1    Jul. 1, 2010

Related U.S. Application Data

(60) Provisional application No. 60/909,898, filed on Apr. 3, 2007.

(51) Int. Cl.
*E21B 43/22* (2006.01)
*E21B 43/24* (2006.01)

(52) U.S. Cl.
USPC ........... 166/300; 166/279; 166/309; 166/303; 166/272.6

(58) Field of Classification Search
None
See application file for complete search history.

(56) References Cited

U.S. PATENT DOCUMENTS

| | | | |
|---|---|---|---|
| 4,748,011 A * | 5/1988 | Baize | 423/228 |
| 5,128,049 A * | 7/1992 | Gatlin | 210/752 |
| 5,347,004 A | 9/1994 | Rivers et al. | |
| 5,405,591 A * | 4/1995 | Galloway | 423/228 |
| 5,480,860 A | 1/1996 | Dillon | |
| 5,980,845 A * | 11/1999 | Cherry | 423/229 |
| 6,582,624 B2 * | 6/2003 | Titley et al. | 252/182.12 |
| 6,942,037 B1 * | 9/2005 | Arnold et al. | 166/312 |
| 2002/0139717 A1 | 10/2002 | Titley et al. | |
| 2003/0166472 A1 * | 9/2003 | Pursley et al. | 507/200 |
| 2005/0238556 A1 * | 10/2005 | Pakulski et al. | 423/228 |
| 2005/0250666 A1 * | 11/2005 | Gatlin et al. | 510/424 |
| 2008/0053920 A1 * | 3/2008 | Pakulski et al. | 210/749 |

FOREIGN PATENT DOCUMENTS

WO    98/19774 A1    5/1998

OTHER PUBLICATIONS

International Search Report from PCT/US2008/059043 dated Sep. 26, 2008 (2 pages).
Written Opinion from PCT/US2008/059043 dated Sep. 26, 2008 (4 pages).
Notification Concerning Transmittal of the International Preliminary Report on Patentability (Chapter I of the Patent Cooperation Treaty) for International Application No. PCT/US2008/059043, mailed on Oct. 15, 2009 (6 pages).
Office Action issued in Canadian Application No. 2,682,595 dated Feb. 3, 2011 (2 pages).
Extended European Search Report issued in related Eurpopean Application No. 08744879.1 dated Apr. 27, 2011 (7 pages).

* cited by examiner

*Primary Examiner* — Zakiya W Bates
*Assistant Examiner* — Silvana Runyan
(74) *Attorney, Agent, or Firm* — Osha Liang LLP

(57) ABSTRACT

A method for treating a wellbore in a hydrogen sulfide-containing formation that includes injecting a first slug in the wellbore, the first slug comprising: at least one of primary amine and ammonia; and a base fluid; injecting a second slug in the wellbore, the second slug comprising: a triazine scavenger; and a base fluid; and allowing the triazine scavenger to react with the hydrogen sulfide is disclosed.

24 Claims, No Drawings

PROCESS FOR PREVENTING OR REMEDIATING TRITHIAZINE DEPOSITION IN HIGH H$_2$S WELLS

CROSS-REFERENCE TO RELATED APPLICATIONS

This application claims priority to U.S. Patent Application No. 60/909,898, filed on Apr. 3, 2007, which is herein incorporated by reference in its entirety.

BACKGROUND OF INVENTION

1. Field of the Invention

Embodiments disclosed herein relate generally to methods of treating wells containing hydrogen sulfide.

2. Background Art

Natural gas is a mixture of hydrocarbons and non-hydrocarbon gases found in geologic formations beneath the earth's surface, often in association with petroleum. As obtained from the ground, raw or sour natural gas contains a number of impurities, namely water, carbon dioxide, hydrogen sulfide, organic sulfides, and condensable hydrocarbons, such as propane, butane, and pentane, which must be removed before being introduced into a pipeline. When idle, and particularly when the hydrocarbons are accompanied by high sulfur concentrations, hazardous sulfur compounds will accumulate at the wellbore, often at pressures significantly above atmospheric pressure. When this buildup of hazardous sulfur compounds occurs, the hazardous compounds can be released into the environment, particularly when maintenance of the well for workover or abandonment purposes is required. Furthermore, it is during such maintenance that there exists the greatest risk of injury and death to maintenance workers and the greatest risk of hazardous emissions to the environment.

Generally speaking, hydrogen sulfide and organic sulfides (collectively here "sulfides"), because of their corrosiveness and toxicity, are typically removed from natural gas in the field prior to introduction to a pipeline for transport to a market or off-site processing plant. The maximum level of hydrogen sulfide, "H$_2$S," the primary sulfide impurity of natural gas, permitted to be introduced into a pipeline is often limited to 4 parts per million (ppm), although in some limited instances, up to 16 ppm is acceptable.

For producing wells, that is wells from which fluids are withdrawn, various methods and processes are, and have been, employed to treat hazardous sulfur compounds to prevent their release to the environment. According to some processes, such treatments are conducted at a time when the sulfur compounds are dissolved or dispersed in or otherwise intimately associated with fluid hydrocarbons after or during the removal of the fluid hydrocarbons from the well and before the fluid hydrocarbon streams are subjected to refinery operations, used as a fuel, or used as a precursor for subsequent operations. Such operations are referred to herein as "upstream" treatments. Other treatments, referred to herein as "down stream" treatments, are conducted after the fluid hydrocarbons have been refined, or prepared for use as a fuel, or employed as a precursor for the manufacture of hydrocarbon-based products.

Hydrogen sulfide, like hydrocarbon components of natural gas, exists in the gaseous state at normal temperatures and pressures. There are a variety of approaches for removing hydrogen sulfide from, or at least substantially reducing the amount of hydrogen sulfide in natural gas, i.e., "sweetening" natural gas. One general approach is to expose the raw natural gas to a treatment liquid containing an agent which chemically reacts with hydrogen sulfide, a so-called a hydrogen sulfide scavenger. Usually, the natural gas is bubbled through the treatment liquid, and as the bubbles rise through the treatment liquid, hydrogen sulfide comes into contact with the agent in the liquid to react and form a non-gaseous, or relatively non-volatile, product. The hydrogen sulfide thus becomes trapped in the liquid phase, and is thereby removed from the gas. In other schemes, a portion of a sulfur-rich gas may be employed to aspirate a treatment fluid and pass the admixed stream through a mixing zone, or an atomizing nozzle before the admixture of gas and treatment fluid is contacted with the fluid in a wellbore, in a pipeline, or in a vessel. Such systems are characterized by operations which employ pumps and compressors to maintain the pressure at the wellbore during the treatment process. When working on a wellbore that is known to have accumulated hazardous sulfur compounds, fluids or water, known as "kill fluids" or "kill water," with a sweetening agent such as triazine, is typically injected into the wellbore so as to raise the hydrostatic pressure in the wellbore and reduce or arrest further influx of said hazardous sulfur compounds into the wellbore.

There are a number of characteristics that are considered desirable in treatments containing such active agents. Generally speaking, it is desirable that the agent be highly reactive, i.e., the H$_2$S (or organic sulfides) should react readily with the agent as the H$_2$S passes through the treatment liquid. At the same time, it is desirable that the agent remain effective even in the presence of a large excess of CO$_2$, that is, it should be selective. The scavenging agent should be easy to handle, that is, be of appropriate viscosity, have a suitable pour point, and low toxicity. Further, it is also desirable that the agent remain in the liquid state and not foam excessively in use to prevent contamination of the treated gas.

Other problems also attend the use of sulfide scavengers. For example, sulfide scavengers can yield reaction products which precipitate and/or polymerize, thereby damaging the permeability of the formation. Additionally, sulfide scavenger reaction products can themselves be corrosive and/or toxic.

When using conventional triazine scavenging treatments, while effective, care must be taken that a sufficient amount of the scavenger is injected into a well. If there is an insufficient amount of triazine injected, i.e., an excess of hydrogen sulfide is present, it has been observed that the dithiazine reaction product from triazine and hydrogen sulfide may react with the excess hydrogen sulfide to form an insoluble product that may damage the formation.

Accordingly, there exists a continuing need for improved compositions and methods for treating sulfide-containing wells.

SUMMARY OF INVENTION

In one aspect, embodiments disclosed herein relate to a method for treating a wellbore in a hydrogen sulfide-containing formation that includes injecting a first slug in the wellbore, the first slug comprising: at least one of primary amine and ammonia; and a base fluid; injecting a second slug in the wellbore, the second slug comprising: a triazine scavenger; and a base fluid; and allowing the triazine scavenger to react with the hydrogen sulfide.

In another aspect, embodiments disclosed herein relate to a method for treating a wellbore in a hydrogen sulfide-containing formation that includes injecting a slug in the wellbore, the slug comprising: a triazine scavenger; at least one of a primary amine and ammonia; and a base fluid; and allowing the triazine scavenger to react with the hydrogen sulfide.

In yet another aspect, embodiments disclosed herein relate to a method of reducing hydrogen sulfide in a wellbore that includes injecting a first slug in the wellbore, the first slug comprising: a primary alkanolamine; a glycol; and a brine; allowing at least a portion of the first slug to leak into the formation; injecting a second slug in the wellbore, the second slug comprising: a primary alkanolamine; a triazine scavenger; a glycol; and a brine; allowing the triazine scavenger to react with the hydrogen sulfide; and initiating flow of natural gas from the formation through the wellbore.

Other aspects and advantages of the invention will be apparent from the following description and the appended claims.

DETAILED DESCRIPTION

In one aspect, embodiments disclosed herein relate to methods of treating wellbores formed in formations containing hydrogen sulfide. In particular, embodiments disclosed herein relate to methods of remediating or preventing the occurrence of insoluble byproducts of a triazine scavenger scavenging hydrogen sulfide.

The triazine structure is a six-membered heterocyclic ring having three carbon atoms and three nitrogen atoms, which may include non-aromatics as well as aromatics. Of the three isomers, 1,3,5-triazine is represented by:

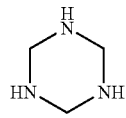

In one embodiment, a 1,3,5-triazine derivative may be synthesized from the reaction between equivalents of an aldehyde or ketone and a primary amine as shown by Eq. 1:

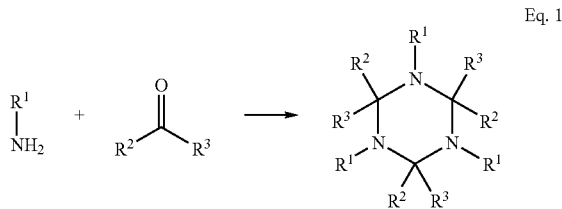

Eq. 1 where $R^1$ may be a hydrogen; a $C_1$-$C_5$ aliphatic group, or a hydroxyl-$C_1$-$C_5$ aliphatic group (such as, for example, a hydroxyethyl group) and $R^2$ and $R^3$ may each independently be selected from a hydrogen, a $C_1$-$C_5$ aliphatic group, or a hydroxyl-$C_1$-$C_5$ aliphatic group (such as, for example, a hydroxyisopropyl group). In a particular embodiment, formaldehyde or paraformaldehyde may be added to a primary alkanolamine, such as monoethanolamine, to form a triazine scavenger in accordance with one embodiment of the present disclosure. The formation and use of triazines as a sulfide scavenger is known in the art, and described, for example, in U.S. Pat. No. 5,405,591, which is herein incorporated by reference in its entirety.

When hydrogen sulfide is exposed to a triazine scavenger, such as the triazine derivative shown as the resulting product in Eq. 1 above, a dithiazine may be formed according to the following reaction shown in Eq. 2:

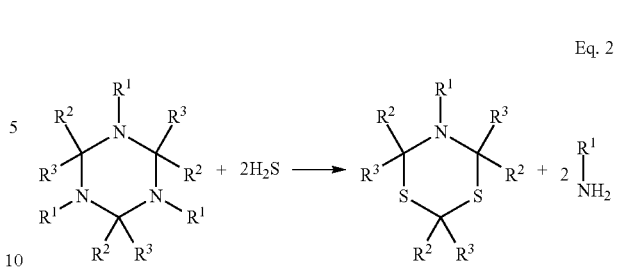

Eq. 2

The dithiazines formed by the above representative reaction scheme may be water-soluble reaction products that may be easily removed from the gaseous stream of hydrocarbons. However, when hydrogen sulfide is present in an excess amount, the primary reaction product, dithiazine, may slowly react with the excess hydrogen sulfide as follows to form a trithiazine:

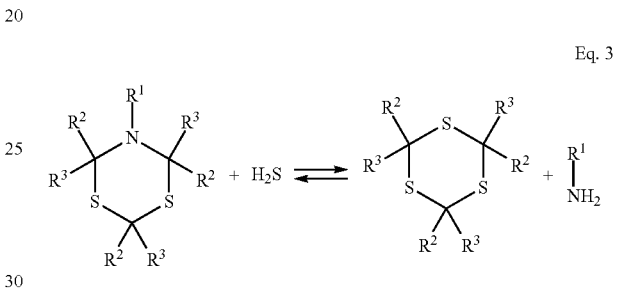

Eq. 3

While dithiazines are water-soluble products, trithiazines are generally much less soluble. Thus, when there is an excess of hydrogen sulfide present in a wellbore or pipeline that is treated with a triazine scavenger, the secondary reaction product, trithiazine, may be formed, and thereupon, precipitation of the trithiazine may ensue.

While the reaction scheme shown in Eq. 3 is a slow reaction, it is reversible. Thus, the inventors of the present application have discovered that if there is an excess of contaminating hydrogen sulfide that needs to be removed from a gaseous stream of hydrocarbons, a treatment of the wellbore with additional quantities of primary amine(s) and/or ammonia may prevent and/or remediate the formation of insoluble trithiazines. In various embodiments, the primary amine and/or ammonia treatment may be either a pre- or post-treatment, and/or may be combined with in a single treatment with the triazine scavenger. In a particular embodiment, a primary amine and/or ammonia treatment of the present disclosure may be a pre-treatment. In various embodiments, the treatments of the present disclosure, including the hydrogen sulfide scavenging treatment and/or the primary amine treatment, may be referred to as a treatment slug or kill pill. As used herein, a kill pill refers to a kill-weight fluid having a density sufficient to produce hydrostatic pressure greater than the reservoir pressure, thereby shutting off flow of formation fluids into the wellbore.

When a primary amine and/or ammonia kill pill pre-treatment is used, due to the differential in the hydrostatic pressure between the kill pill within the wellbore and the formation, a quantity of the primary amine and/or ammonia pill may be controllably leaked into the formation. A hydrogen sulfide scavenging pill or slug containing a triazine scavenger may be injected into the wellbore following the primary amine and/or ammonia pre-treatment to react with hydrogen sulfide present therein. Following the reaction between the triazine scavenger and hydrogen sulfide, which may result in a dithiazine primary product or a triazine secondary product, as described above, the well may be flowed back into production. When the well is flowed back into production, the primary amine and/or ammonia previous injected may be available to react with any trithiazines formed as the secondary product.

In one embodiment, a first slug comprising a base fluid and a primary amine and/or ammonia is pumped or injected into a well. Following the injection of the first slug, a second slug comprising a base fluid, a primary amine and/or ammonia, and a triazine scavenger may be pumped or injected into the well, and the triazine scavenger allowed to react with hydrogen sulfide to convert the sulfur into a non-toxic form. Further, while the above description describes injecting the primary amine and/or ammonia as a pre-treatment, one of ordinary skill in the art would appreciate that in other embodiments, the triazine pill may optionally precede the primary amine and/or ammonia treatment.

In other embodiments, the primary amine and/or ammonia may not be required for the triazine treatment, i.e., the quantity of primary amine and/or ammonia in the first pill may be sufficient to prevent and/or remediate the formation of trithiazines. In yet other embodiments, multiple pills may not be required, i.e., a single pill containing a primary amine and/or ammonia and a triazine may be sufficient to prevent and/or remediate the formation of trithiazines.

Further, depending on the well and formation in which the hydrogen sulfide is located, it may be desirable to heat either or both of the first and second slugs. Such heating may be desirable for maintaining a desirable viscosity, etc.

In gas streams or wellbores subjected to low temperatures and/or elevated pressures in the presence of free water, there exists a susceptibility for the formation of gas hydrate crystals. Gas hydrates are clathrates (inclusion compounds) in which small hydrocarbon molecules are trapped in a lattice typically consisting of water molecules (see, for example, Clathrate Hydrates of Natural Gas, third edition (2007), by E. Dendy Sloan and Carolyn Koh, Colorado School of Mines). Hydrates form as a consequence of the tendency of water to reorient in the presence of a non-polar solute (typically light hydrocarbon gases such as methane) to stabilize the lattice through, typically, van der Waals interactions while maintaining the hydrogen bonding between the water molecules. However, hydrogen sulfide, as well as several other compounds, is also capable of occupying the interior positions in a clathrate lattice of water molecules and stabilizing the overall structure so that it does not decompose until a relatively substantial increase in temperature or decrease in pressure occurs or both occur.

In another embodiment, the first and/or second slug may be heated to initiate the decomposition of any hydrate agglomerates that have formed in a wellbore. Once melted, the hydrogen sulfide released from the hydrate may be consumed by the triazine scavenger present in the second slug, thereby reducing or preventing the reformation of hydrogen sulfide hydrate crystals.

Base Fluid

In one embodiment, the base fluid in the first and/or second slug may each individually include a water-miscible solvent, such as a glycol, for example. One example of a water-miscible solvent suitable for use as a base fluid in the present disclosure includes a $C_2$-$C_6$ alkyl glycol, and ethylene glycol in particular. However, in other embodiments, diethylene glycol, triethylene glycol, tetraethylene glycol, propylene glycol, dipropylene glycol, tripropylene glycol, tetrapropylene glycol, and the like), alcohol-glycol ethers (e.g., ethylene glycol monobutyl ether, methyl diethylene glycol, ethyl triethylene glycol, propyl tetraethylene glycol, ethyl propylene glycol, methyl dipropylene glycol, propyl tripropylene glycol, and the like), or alcohols may be also used without departing from the scope of the invention.

In another embodiment, the base fluid in each the first and second slug is an aqueous fluid, and individually includes at least one of fresh water, sea water, brine, mixtures of water and water-soluble organic compounds, and mixtures thereof. For example, the aqueous fluid may be formulated with mixtures of desired salts in fresh water. Such salts may include, but are not limited to alkali metal chlorides, hydroxides, formates or other carboxylates, for example. In various embodiments of the drilling fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, silicates, sulfates, phosphates, and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the drilling fluid may be controlled by increasing the salt concentration in the brine (up to saturation). In a particular embodiment, a brine may include halide or formate or other carboxylate salts of mono- or divalent cations of metals, such as cesium, potassium, calcium, zinc, and/or sodium.

In one embodiment, the base fluid in the first and/or second slug may each individually include both a water-miscible solvent as well as a brine or sea water. In one embodiment, the base fluid in the first and/or second slug may each individually include a water-miscible solvent in amount ranging from about 50 to 80 percent by weight of the pill, and 60-70 percent by weight in another embodiment, and a brine in an amount ranging from 0 to about 15 percent by weight of the pill, and 4 to 8 percent by weight in another embodiment.

Primary Amine or Ammonia

As discussed above, the first and/or second slug of the present disclosure may contain a primary amine and/or ammonia. Various types of primary amines may be used in accordance with the present disclosure. For example, primary amines suitable for use in the present disclosure may include $C_1$-$C_5$ aliphatic substituents, functionalized or not. In a particular embodiment, the primary amine may include a $C_1$-$C_5$ alkanolamine. However, one of ordinary skill in the art would appreciate that other primary amines such as an aliphatic or aromatic primary amine have greater than five carbon atoms may also be used.

Additionally, in other embodiments, ammonia may be used to prevent or remediate the formation of a trithiazine. One of ordinary skill in the art would appreciate that ammonia may be provided in various forms, such as aqueous ammonia, i.e., ammonium hydroxide, or as an ammonium salt.

Triazine Scavenger

The triazine scavenger that may be used in the second slug may include various types of triazine-based compounds. In a particular embodiment, a triazine scavenger according to the present disclosure may include those formed from a $C_1$-$C_6$ aldehyde (mono- or di-aldehyde), ketone, or carboxylic acid reacted with a primary amine having a $C_1$-$C_5$ aliphatic substituent, and a $C_1$-$C_5$ alkanolamine in a particular embodiment. Examples of suitable aldehydes include, but are not limited to, monoaldehydes such as formaldehyde, acetaldehyde, propionaldehyde (propanal), and n-butyraldehyde (1-butanal), dialdehydes such as ethanedial, propanedial, and glutaraldehyde. In a particular embodiment, the triazine scavenger may be present in the second slug in an amount ranging from about 20 to 50 gallons per barrel. One of ordinary skill in the art would appreciate that typically, the amount of triazine scavenger may vary, for example, depending on the amount of hydrogen sulfide to be removed. However, according to the pill of the present disclosure, if large amounts of hydrogen sulfide are present, less triazine than conventionally used may be injected or pumped into the well in addition with a primary amine, as described above. One example of a triazine scavenger that may be used in the second slug that is commercially available is SAFE-SCAV™ HSW, available from M-I LLC (Houston, Tex.).

pH

In various embodiments it may be desirable to control the pH of either the first and/or second slug, such as to a pH ranging from about 9 to 11. While control of the pH is not necessary for the above described reactions to occur, one of ordinary skill in the art would appreciate that a caustic pH may be desirable for keeping the soluble hydrosulfide content low for safety purposes. Various types of caustics known in the art may be used as a pH buffer, including, for example, hydroxides, carbonates, and oxides of alkali or alkaline earth metals. Additionally, in another embodiment, the primary amine and/or ammonia of the first and/or second slug may also serve as a pH buffer.

EXAMPLE

An exemplary embodiment of the slugs of the present disclosure may be formulated as follows. A volume of 100 barrels of the first slug is formed as shown below in Table 1.

TABLE 1

| bbl/100 bbl | Component |
|---|---|
| 66.00 | Ethylene glycol (MEG) |
| 0.512 | Monoethanolamine (MEA) |
| 33.49 | Water (containing 5% KCL by weight of water) |

Once the first slug is pumped downhole, a volume of 200 barrels of the second slug may be formed as shown below in Table 2, and pumped into the wellbore.

TABLE 2

| bbl/100 bbl | Component |
|---|---|
| 65.30 | Ethylene glycol (MEG) |
| 1.06 | SAFE-SCAV ™ HSW |
| 0.50 | Monoethanolamine (MEA) |
| 33.14 | Water (containing 5% KCL by weight of water) |

Advantageously, embodiments of the present disclosure may provide for at least one of the following. In wells or formations having high levels of hydrogen sulfide, or higher than expected levels of hydrogen sulfide, the slugs of the present disclosure may allow for a cost-efficient treatment, whereby a lesser amount of triazine may be used and still allow for the effective removal of hydrogen sulfide. Further, if insoluble trithiazine is formed, the presence of the primary amine may allow for a remediating reversal of the reaction, thereby reducing or preventing damage to the formation.

Additionally, if gas hydrate crystals have been formed due to low temperatures and/or high pressures, the slugs of the present disclosure may be used to first melt the crystals and then reduce or prevent their reformation by reaction of the released hydrogen sulfide with the triazine scavenger. Further, when a glycol base fluid is used, the glycol may provide thermal conductivity to the slug in addition to hydrate inhibiting characteristics when hydrate crystals are present.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method for treating a wellbore in a hydrogen sulfide-containing formation, comprising:
   injecting a first slug in the wellbore, the first slug comprising:
      at least one of primary amine and ammonia; and
      a base fluid;
   injecting a second slug in the wellbore, the second slug comprising:
      a triazine scavenger; and
      a base fluid; and
   allowing the triazine scavenger to react with the hydrogen sulfide.

2. The method of claim 1, further comprising:
   allowing at least a portion of the first slug to leak into the formation.

3. The method of claim 1, further comprising:
   initiating flow of natural gas from the formation through the wellbore.

4. The method of claim 1, further comprising:
   heating the first slug prior to the injecting.

5. The method of claim 4, further comprising:
   melting at least a portion of a hydrate agglomerate present in the wellbore with the heated first plug.

6. The method of claim 1, further comprising:
   heating the second slug prior to the injecting.

7. The method of claim 1, wherein the primary amine of the first slug comprises an alkanolamine.

8. The method of claim 1, wherein the second slug further comprises at least one of a primary amine or ammonia.

9. The method of claim 1, wherein the triazine scavenger comprises a 1,3,5-triazine derivative.

10. The method of claim 1, wherein the base fluid comprises at least one of fresh water, sea water, brine, mixtures of water and water-soluble organic compounds, and mixtures thereof.

11. The method of claim 1, wherein the base fluid comprises a water-miscible solvent.

12. The method of claim 11, wherein the base fluid comprises at least one of ethylene glycol, diethylene glycol, triethylene glycol, tetraethylene glycol, propylene glycol, dipropylene glycol, tripropylene glycol, tetrapropylene glycol, ethylene glycol monobutyl ether, methyl diethylene glycol, ethyl triethylene glycol, propyl tetraethylene glycol, ethyl propylene glycol, methyl dipropylene glycol, and propyl tripropylene glycol.

13. The method of claim 11, wherein the second slug comprises a pH ranging from about 9 to 11.

14. The method of claim 1, wherein the second slug further comprises a pH buffer.

15. The method of claim 1, wherein a secondary reaction product from the reaction between the triazine scavenger and hydrogen sulfide comprises a trithiazine.

16. The method of claim 15, further comprising:
allowing the primary amine of the first slug to react with the trithiazine.

17. The method of claim 1, wherein the triazine scavenger is present in an amount such that the hydrogen sulfide is present in an excess amount in the wellbore.

18. A method for treating a wellbore in a hydrogen sulfide-containing formation, comprising:
injecting a slug in the wellbore, the slug comprising:
a triazine scavenger;
at least one of a primary amine and ammonia; and
a base fluid; and
allowing the triazine scavenger to react with the hydrogen sulfide,
wherein the triazine scavenger is present in an amount such that the hydrogen sulfide is present in an excess amount in the wellbore.

19. The method of claim 18, wherein a secondary reaction product from the reaction between the triazine scavenger and hydrogen sulfide comprises a trithiazine.

20. The method of claim 19, further comprising:
allowing the primary amine to react with the trithiazine.

21. A method of reducing hydrogen sulfide in a wellbore, comprising:
injecting a first slug in the wellbore, the first slug comprising:
a primary alkanolamine;
a glycol; and
a brine
allowing at least a portion of the first slug to leak into the formation;
injecting a second slug in the wellbore, the second slug comprising:
a primary alkanolamine;
a triazine scavenger;
a glycol; and
a brine;
allowing the triazine scavenger to react with the hydrogen sulfide; and
initiating flow of natural gas from the formation through the wellbore.

22. The method of claim 21, wherein a secondary reaction product from the reaction between the triazine scavenger and hydrogen sulfide comprises a trithiazine.

23. The method of claim 22, further comprising:
allowing the primary amine of the first slug to react with the trithiazine.

24. The method of claim 21, wherein the triazine scavenger is present in an amount such that the hydrogen sulfide is present in an excess amount in the wellbore.

* * * * *